United States Patent
Cleveland

(10) Patent No.: US 7,761,058 B2
(45) Date of Patent: Jul. 20, 2010

(54) METHOD AND PROCEDURE FOR SELF DISCOVERY OF SMALL OFFICE OR HOME INTERIOR STRUCTURE BY MEANS OF ACOUSTIC SENSING AND PROFILING

(75) Inventor: Joseph Cleveland, Murphy, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 957 days.

(21) Appl. No.: 11/389,634

(22) Filed: Mar. 24, 2006

(65) Prior Publication Data
US 2007/0225000 A1    Sep. 27, 2007

(51) Int. Cl.
H04B 17/00  (2006.01)
H04B 1/00   (2006.01)
H04B 7/00   (2006.01)
H04B 1/04   (2006.01)
H04W 36/00  (2009.01)

(52) U.S. Cl. ............... 455/67.11; 455/69; 455/126; 455/444; 455/446; 455/517; 370/305; 370/332; 370/335; 725/106; 725/114

(58) Field of Classification Search ............. 455/67.11, 455/69, 444, 126, 446, 517, 522, 575.2; 370/305, 370/332, 335; 725/106, 114
See application file for complete search history.

(56) References Cited

U.S. PATENT DOCUMENTS

| | | | | |
|---|---|---|---|---|
| 5,715,526 | A  * | 2/1998  | Weaver, Jr. et al. | 455/126 |
| 5,839,052 | A  * | 11/1998 | Dean et al. | 725/106 |
| 5,867,763 | A  * | 2/1999  | Dean et al. | 725/114 |
| 5,884,187 | A  * | 3/1999  | Ziv et al. | 455/522 |
| 6,307,849 | B1 * | 10/2001 | Tiedemann, Jr. | 370/335 |
| 7,009,953 | B2 * | 3/2006  | Tiedemann, Jr. | 370/332 |
| 7,010,332 | B1 * | 3/2006  | Irvin et al. | 455/575.2 |
| 7,292,873 | B2 * | 11/2007 | Wei et al. | 455/522 |
| 2001/0030948 | A1 * | 10/2001 | Tiedemann, Jr. | 370/305 |
| 2005/0032536 | A1 * | 2/2005  | Wei et al. | 455/517 |
| 2006/0019694 | A1 * | 1/2006  | Sutivong et al. | 455/522 |
| 2006/0234752 | A1 * | 10/2006 | Mese et al. | 455/522 |
| 2007/0225000 | A1 * | 9/2007  | Cleveland | 455/446 |
| 2007/0270100 | A1 * | 11/2007 | Agrawal et al. | 455/67.11 |
| 2007/0270151 | A1 * | 11/2007 | Claussen et al. | 455/444 |
| 2008/0039022 | A1 * | 2/2008  | Wei et al. | 455/69 |

* cited by examiner

Primary Examiner—William D Cumming

(57) ABSTRACT

A small office/home office base transceiver station includes an acoustic sensor array. Directions from which acoustic signals are detected are presumed to correspond to the interior of the building within which the base transceiver station is located, and with human activity within that interior, while directions from which few or no acoustic signals are detected are presumed to correspond to proximate outside walls. Transmit power gain for directional antenna array elements used for communications are then set to reduce transmission of power in directions that might result in interference with adjacent base transceiver stations.

20 Claims, 6 Drawing Sheets

METHOD AND PROCEDURE FOR SELF DISCOVERY OF SMALL OFFICE OR HOME INTERIOR STRUCTURE BY MEANS OF ACOUSTIC SENSING AND PROFILING

TECHNICAL FIELD

The present disclosure is directed, in general, to wireless communication systems and, more specifically, to self-configuration of small office or home office wireless communication devices.

BACKGROUND

Ad hoc wireless communication networks can frequently result in coverage issues, such as interference resulting from neighboring devices even when such devices are configured to detect each other and adapt overall or directional transmit power accordingly. For instance, a pair of small office or home office (SOHO) base transceiver stations (BTSs) in adjacent buildings may not detect each other due to outside wall penetration losses. A mobile or "subscriber" unit between or inside one of the two buildings, however, may detect both, due to differences in distance, differences in interior versus exterior wall penetration losses, or both. This interference scenario is sometimes referred to as the "hidden node problem."

There is, therefore, a need in the art for automatically configuring wireless devices to avoid introducing significant interference outside the intended coverage area.

SUMMARY

A small office/home office base transceiver station includes an acoustic sensor array. Directions from which acoustic signals are detected are presumed to correspond to the interior of the building within which the base transceiver station is located, and with human activity within that interior, while directions from which few or no acoustic signals are detected are presumed to correspond to proximate outside walls. Transmit power gain for directional antenna array elements used for communications are then set to reduce transmission of power in directions that might result in interference with adjacent base transceiver stations.

The foregoing has outlined rather broadly the features and technical advantages of the subject matter disclosed so that those skilled in the art may better understand the detailed description that follows. Additional features and advantages will be described hereinafter that form the subject of the claims. Those skilled in the art will appreciate that they may readily use the conception and the specific embodiment(s) disclosed as a basis for modifying or designing other structures for carrying out the same purposes identified herein, as well as other purposes. Those skilled in the art will also realize that such equivalent constructions do not depart from the spirit and scope of the disclosed subject matter in its broadest form.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device.

Figure 1:
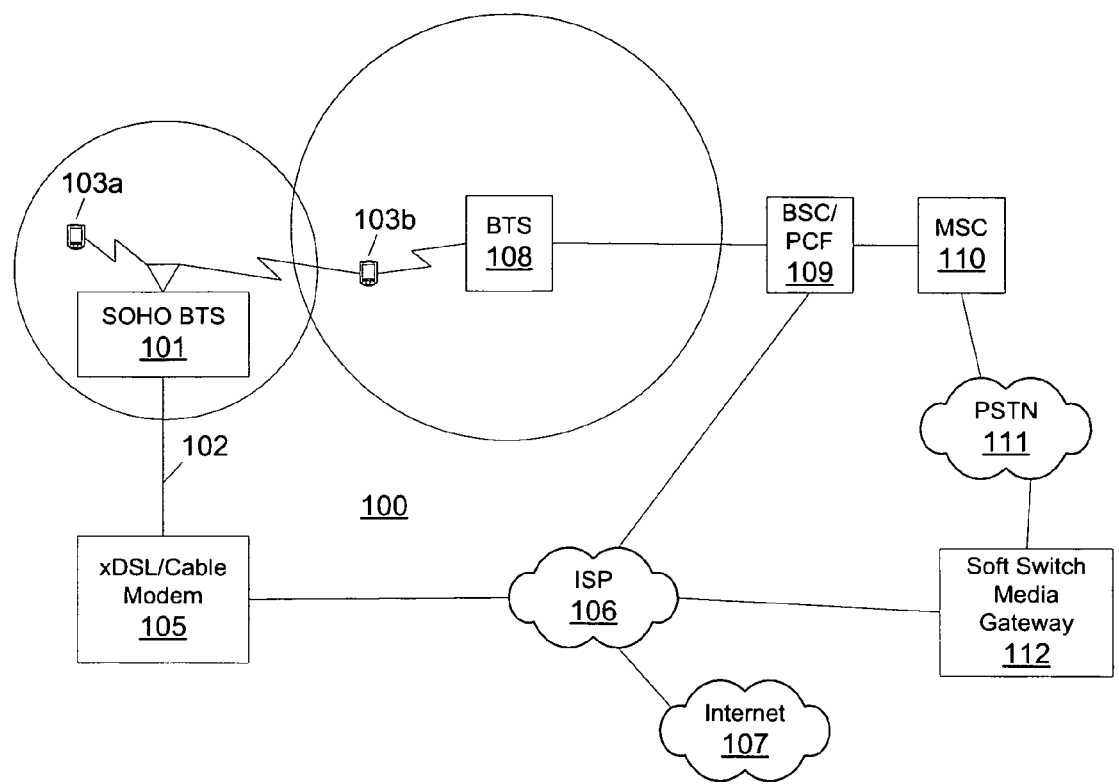
FIGS. 1, 1A and 1B are high-level block diagrams of a wireless network and portions thereof having a small office/home office base transceiver station with self-discovery of interior directions therein according to one embodiment of the disclosure.
Figure 1A:
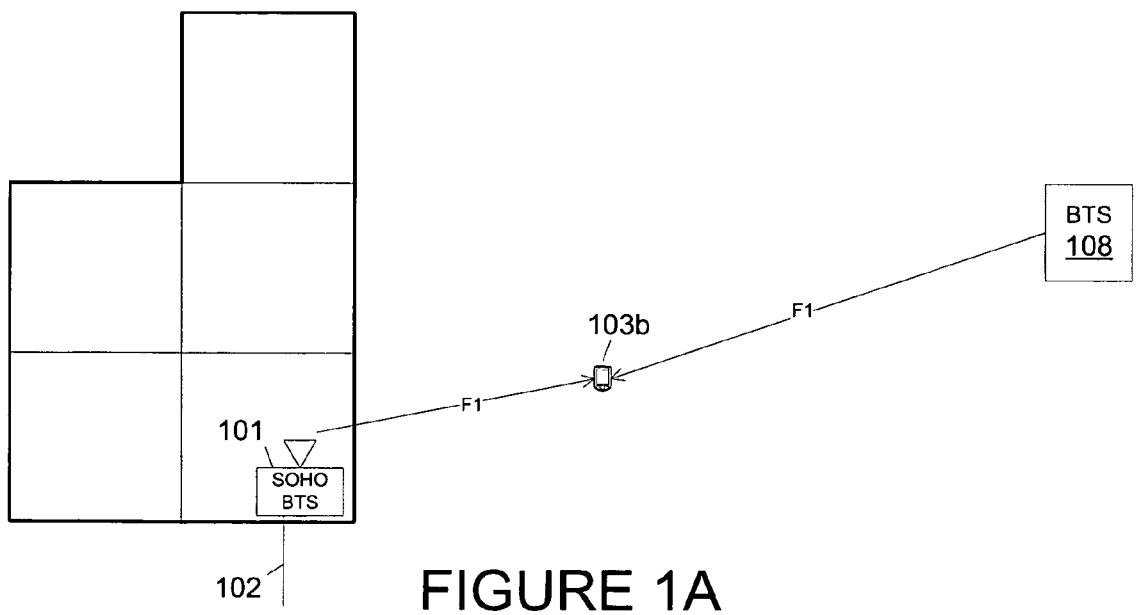
Figure 1B:
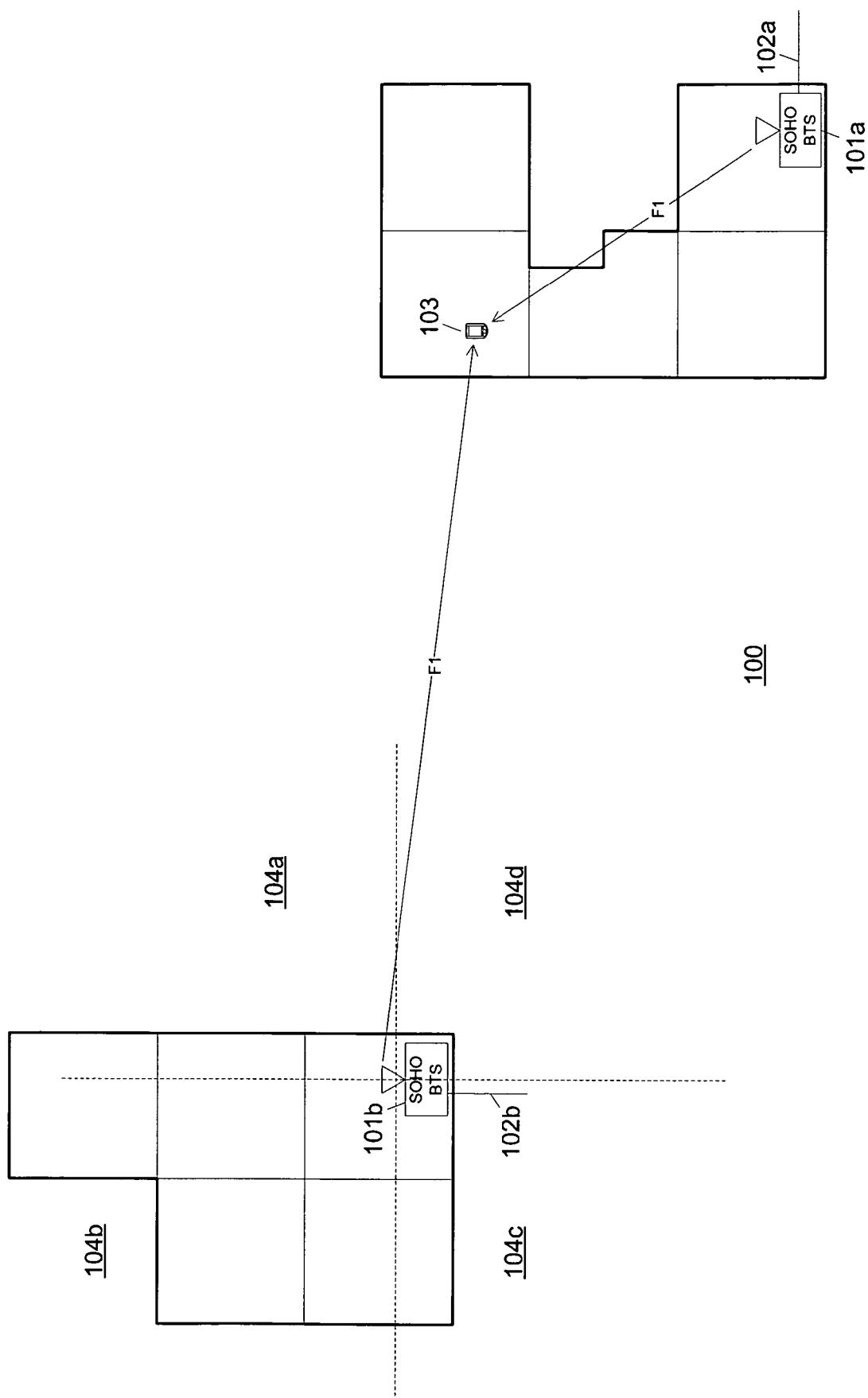

FIGS. 1, 1A and 1B are high-level block diagrams of a wireless network and portions thereof having a small office or home office base transceiver station with self-discovery of interior structures therein according to one embodiment of the present disclosure. A wireless network 100 includes a small office or home office (SOHO) base transceiver station 101 ("SOHO BTS" or "small BTS") connected to an Internet 107, for example by an asymmetric digital subscriber line (ADSL) or symmetric digital subscriber line (SDSL) (collectively XDSL) or cable modem connection 105 to an Internet service provider (ISP) 106, and by ISP 106 to the Internet 107. In another embodiment, the SOHO BTS 101 may connect to the Internet 107 through different interfaces or communication protocols.

Wireless network 100 also includes a conventional wireless base transceiver station 108 coupled to, for example, a base station controller (BSC) 109 with optional Packet Control Function (PCF). BSC/PCF 109 may be coupled, in turn, to ISP 106 and by mobile switching center (MSC) 110 to public-switched telephone network (PSTN) 111. A soft switch media gateway 112 couples ISP 106 to PSTN 111 in the example shown.

Mobile devices 103a and 103b wirelessly communicate with either or both of SOHO BTS 101 and conventional BTS 108. Adaptive interference control may be employed to economically provide coverage within a small office or home office while limiting interference to wireless services external to the small office or home office. In one embodiment, the SOHO BTS 101 employs multiple narrow beam antennas fed by a common transmit chain with a power divider dividing the power into N separate signals (where N is any positive non-zero integer), each of which drives a variable attenuator and antenna element. The attenuator settings are determined based upon the small office or home office interior configuration.

For in-building applications, a small BTS 101 is located within the confines of the small office or home office. Small BTS 101 provides sufficient transmit power to overcome attenuation of interior walls and floors for wireless communication with a mobile device 103a that does not receive sufficient power from macro BTS 108 for wireless communication with the macro BTS 108. The small BTS 101 supplements a macrocell network where the coverage is poor due to propagation loss or obstructions, or where no wireless service is provided but where XDSL or cable broadband services exists through wireline connections. However, where wireless communications through a macro BTS 108 is provided in the area including the small office or home office, the small BTS 101 should operate without introducing significant interference to the external coverage environment. Small BTS 101 should instead place the transmitted power where needed within the small office or home, for example using radio frequency (RF) beam forming techniques.

As illustrated in FIG. 1A, small BTS 101 is employed to provide enhanced wireless coverage within a small office or home. Small BTS 101 includes a connection 102 to a wireless core network device such as a base station controller (BSC) or mobile switching center (MSC), or to a public switched data network (PSDN), via an Internet protocol (IP) network as depicted in FIG. 1. In the example shown, small BTS 101 operates on the same wireless channel F1 as a macro BTS 108, and potentially interferes with mobile device 103b receiving a signal from macro BTS 108. Operation using the same carrier channel is necessary where, for example, spectrum is not available for dedicated small BTS operation.

Because xDSL or cable access typically is provided at an outside wall, the small BTS 101 will most likely be located near the xDSL or cable access point, and therefore near that outside wall. The small BTS 101 needs to transmit with sufficient power to overcome interior wall (and ceiling/floor) penetration losses in order to provide sufficient signal strength to a mobile device 103 within a distant room. However, since the outside wall attenuation may be less that the total interior wall penetration loss, a strong signal may be transmitted through the outside wall to interfere with the external coverage provided by the macrocell network through macro BTS 108. This interference could be so severe as to cause call failure, loss of pilot and handoff failure for the mobile device 103b.

As illustrated in FIG. 1B, the technique disclosed herein also has applicability to a wireless network 100 that includes at least two small office or home office base transceiver stations 101a and 101b, as for example when two neighboring houses each enclose a SOHO BTS 101. A different form of interference may occur when one small BTS 101a operates in proximity to another small BTS 101b, as when the small BTSs 101a and 101b are located in neighboring homes. This interference scenario is sometimes referred to as the "hidden node" problem, where interference between as a mobile device 103 from adjacent small BTSs 101a and 101b may occur due to differences in outside wall penetration loss and total interior wall penetration losses, with wall penetration and propagation losses preventing the two small BTSs 101a and 101b from discovering each other.

As previously noted, small BTSs 101a and 101b are located within the confines of an office building or home to supplement a macrocell network where either coverage is poor or there is no wireless service but broadband wireline service exists. Small BTSs 101a and 101b provide sufficient transmit power to overcome the attenuation of interior walls and floors in the building (depicted by the thinner lines), and also to inadvertently overcome the attenuation of exterior walls (depicted by the thicker lines).

Small BTSs 101a and 101b are typically located proximate to a broadband wireline (e.g., T1, cable or digital subscriber line) access point for the respective buildings, which will typically be at an outside wall for a home or small office building. Each small BTS 101a and 101b has a connection 102a and 102b, respectively, to such broadband wireline communications system (not shown in FIG. 1B). It is assumed, for the purposes of the exemplary embodiment, that wall penetration losses and/or intervening distances are too great for small BTSs 101a and 101b to discover each other.

A fixed or mobile "subscriber" unit 103 capable of wireless communication with both small BTSs 101a and 101b is located within an overlapping coverage area of both small BTSs 101a and 101b when both small BTSs 101a and 101b transmit at full power in an omni-directional manner. Subscriber unit 103 may be any device having wireless communication capability such as a telephone, wireless electronic mail and/or Short Message Service (SMS) text messaging device, and/or a personal digital assistant (PDA), or a desktop or laptop computer, etc. Small BTSs 101a and 101b and subscriber unit 103 are capable of communicating with each other using any one or more of the IEEE 802.11, IEEE 802.16, IS-95 Code Division Multiple Access (CDMA) (also referred to as TIA-EIA-95 or "cdmaone"), CDMA 2000, CDMA 1X, and/or CDMA 1X EV-DO standards.

Those skilled in the art will recognize that the components depicted and described herein form a portion of and operate in conjunction with a larger wireless communications network having a number of macrocells (such as but not limited to the network 100 depicted in FIG. 1), with small BTSs 101a and 101b and subscriber unit 103 located in one such macrocell. For simplicity and clarity, however, only so much of the construction and operation of the overall wireless communications network and the components therein as is unique to the present disclosure or necessary for an understanding of the present disclosure is depicted in FIGS. 1A and 1B and described in detail herein.

Communication by subscriber unit 103 with each small BTS 101a and 101b may be assumed to require overhead of +7 decibels referenced to one milliwatt (dBm), and to experience −37 decibels (dB) coupling loss and −20 dB propagation loss. For the purposes of illustration of the potential "hidden node" problem, a worst case of worse standard deviation losses at subscriber unit 103 for small BTS 101a (e.g., −1.28*16 dB) than for small BTS 101b (e.g., −1.28*12 dB) may be assumed. Wall penetration losses that are equal for interior and exterior walls at −10 dB for each wall may also be assumed. The wall penetration loss at subscriber station 103 for signals from small BTS 101a in that case would be −50 dB (penetration of five walls), versus −20 dB for signals from small BTS 101*b* (penetration of two walls). As a result, the received power at subscriber unit 103 from small BTS 101*a* would be approximately −120.5 dBm. On the other hand, the received power at subscriber unit 103 from small BTS 101*b* would be approximately −85 dBm. The difference may result in lost coverage and blocked or dropped communications.

The above description of signal strength is based on omni-directional transmission by each small BTS 101*a* and 101*b*. In the embodiments of FIGS. 1A and 1B, however, at least small BTS 101/101*b* (and preferably also small BTS 101*a*) is adapted to radiate radio frequency (RF) power in directions necessary for interior coverage, while reducing or eliminating the transmission of RF power in directions that might result in interference with communications between subscriber unit 103 and either the macro BTS 108 or adjacent small BTS cells (e.g., small BTS cell 101*a*).

Figure 2:
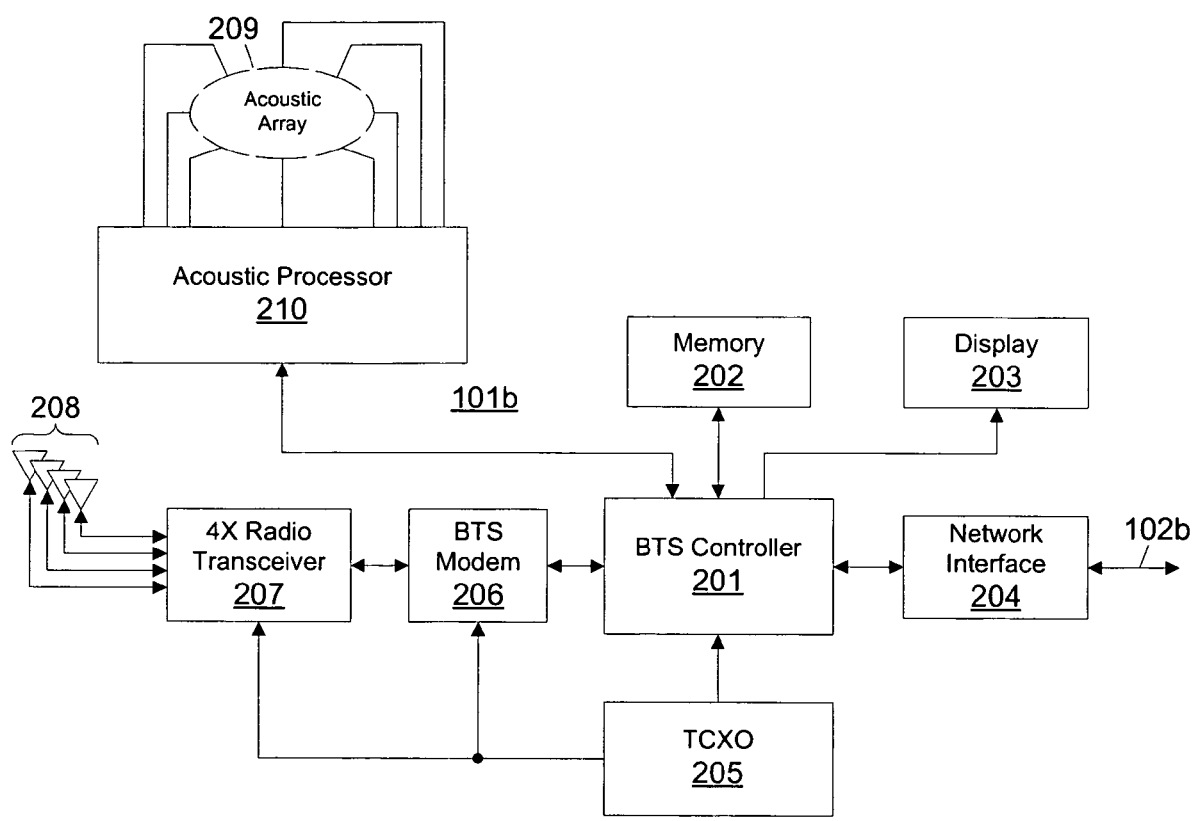
FIG. 2 is a high-level block diagram of a small office/home office base transceiver station with self-discovery of interior directions according to one embodiment of the disclosure.

FIG. 2 is a high-level block diagram of a small office or home office base transceiver station with self-discovery of interior directions according to one embodiment of the present disclosure. Small BTS 101*b* (taken as exemplary of small BTS 101, small BTS 101*a*, and small BTS 101*b*) includes a controller 201, memory 202, a display 203, and network interface 204 to broadband wireline connection 102*b*, an oscillator 205 (a temperature-controlled crystal oscillator TCXO in the exemplary embodiment) providing a synchronization source, a modem 206, and a radio transceiver 207 comprising four transceiver paths coupled to an array of directional antenna elements 208. Directional antenna elements 208 may comprise, for example, an adaptive antenna array or a multiple-input, multiple-output (MIMO) antenna array. Components 201-208 are constructed and operate in accordance with the known art, with the exception of controller 201 having additional programming described in further detail below.

Small BTS 101*b* is also equipped with an acoustic sensing array 209 that detects the angle of arrival of human voice and other acoustic signals within the small office or home. During operation, the acoustic array 209 senses the presence of live human speech, radio and television output, household noise (e.g., from appliances) and/or other sounds indicative of movement. If the small BTS 101*b* is located proximate to an outside wall, acoustic noise originating beyond the outside wall will be significantly attenuated by the wall, while noise originating from interior regions of the small office or home will be louder.

Antenna elements 208 for the wireless air interface (e.g., CDMA 2000, 1XEVDO, etc.) form an adaptive antenna with directional gain for providing appropriate directional coverage within the small office or home. Antenna elements 208 allow wireless communication over a full 360° of directions with a resolution depending on the number of elements within array 208 (e.g., approximately 90° sectors for four elements or approximately 60° sectors for six). In the example shown, four antennae make up the adaptive antenna array 208, such that four transceiver paths are provided using four quadrant beamforming.

By using beamforming and time-of-arrival techniques, the acoustic processor 210 coupled to acoustic sensing array 209 determines the direction of arrival of acoustic signals and interprets those directions as appropriate for radio frequency (RF) coverage by small BTS 101*b*. Directions with few or no incident sounds (acoustic signals) are recognized by the acoustic processor 210 as being in close proximity to an outside wall and deemed by the acoustic processor 210 as directions inappropriate for RF coverage by the small BTS 101*b*. In this way the acoustic processor deduces enough of the orientation of the SOHO BTS 101 to selectively direct RF transmission generally inwards to the interior of the building or home and to reduce RF transmission generally outwards to the exterior of the building, as for example through an adjacent outside wall of the building.

Upon discovery of interior directions, the BTS controller 201 sets beamforming array coefficients for the BTS modem 206 and adaptive antenna array transceiver 207 based on the discovery of interior directions. Modem 206 and transceiver 207 subsequently create transmit beams to cover the interior areas and to limit radiation into external areas.

Thus, for example, the transmit power for small BTS 101*b* may be set to a first, higher value (e.g., "on") for sectors 104*a*-104*c* depicted in FIG. 1B and to a second, lower value (e.g., "off") for sector 104*d*. In this manner, small BTS 101*b* reduces interference outside the desired coverage area.

Figure 3:
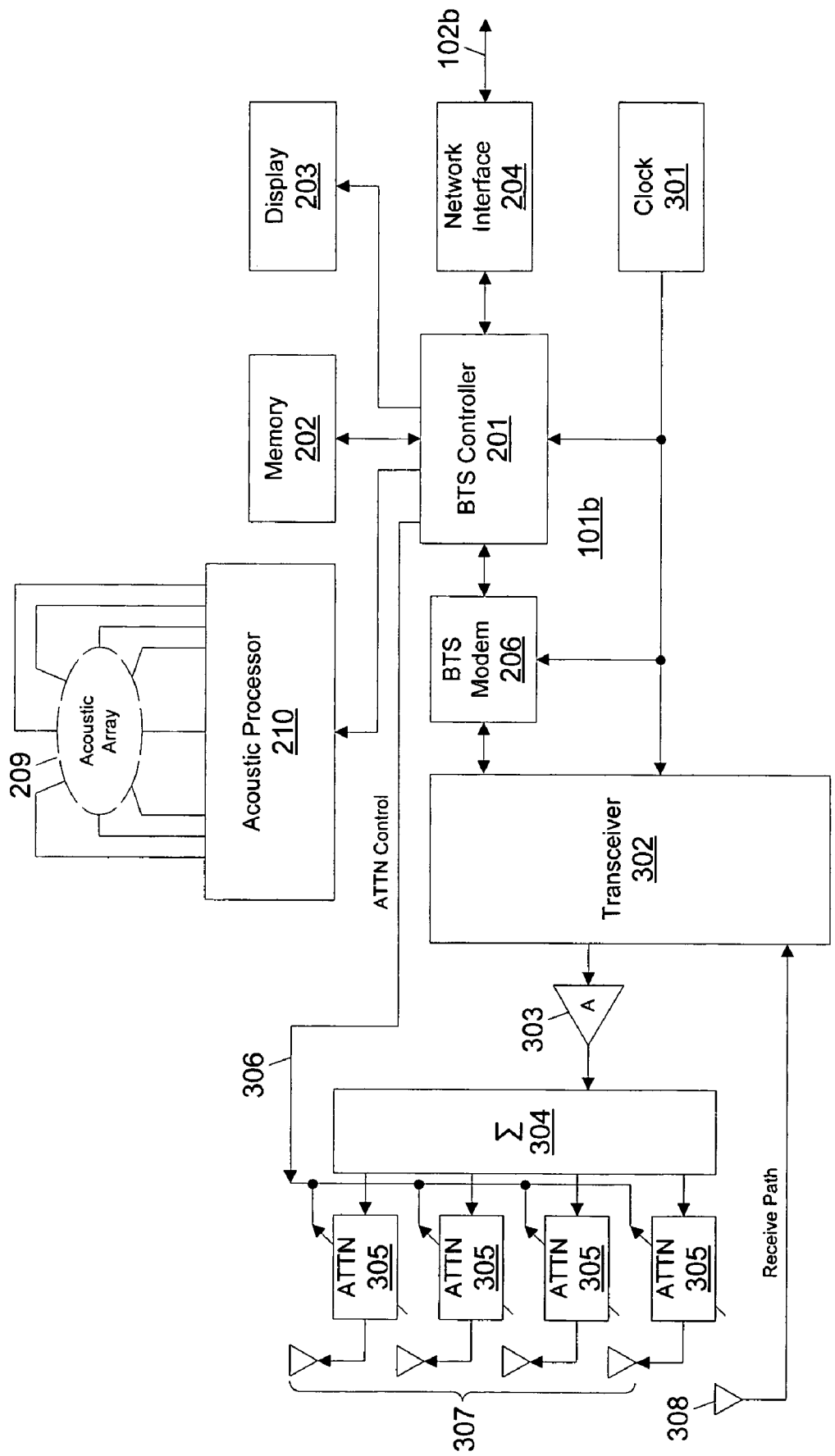
FIG. 3 is a high-level block diagram of a small office/home office base transceiver station with self-discovery of interior directions according to another embodiment of the disclosure.

FIG. 3 is a high-level block diagram of a small office/home office base transceiver station with self-discovery of interior structures according to another embodiment of the disclosure. In this embodiment, small BTS 101*b* (again taken as exemplary of small BTS 101, small BTS 101*a* and small BTS 101*b*) includes a processor or controller 201, memory 202, display 203, and network interface 204, operating using a common clock source 301. An acoustic sensing array 209 and associated acoustic processor 210 are coupled to processor or controller 201.

In this embodiment of the disclosure, the wireless communications transmit chain from transceiver 302, which includes an amplifier (A) 303 and a radio frequency splitter (E) 304 in the example shown, is split into multiple paths. The transmit power for each path is independently controlled by a variable attenuator (ATTN) 305 under the control of a signal 306 from processor/controller 201. Each transmit signal path is connected to a different directional antenna or antenna element 307, with four such transmit paths for four quadrant beamforming being illustrated in this example. A separate receive path from antenna element 308 to transceiver 302 is provided.

When the discovery of the interior directions is complete, the processor or controller 201 uses direction-of-arrival data obtained from the acoustic processor 210 to set the attenuation value for each attenuator 305 within a particular transmit path in order to provide directional interior coverage while limiting transmission power outside the small office or home. Processor or controller 201 sets the attenuation values to attenuate power into the antenna elements for directions from which no significant acoustic signal was detected.

Figure 4:
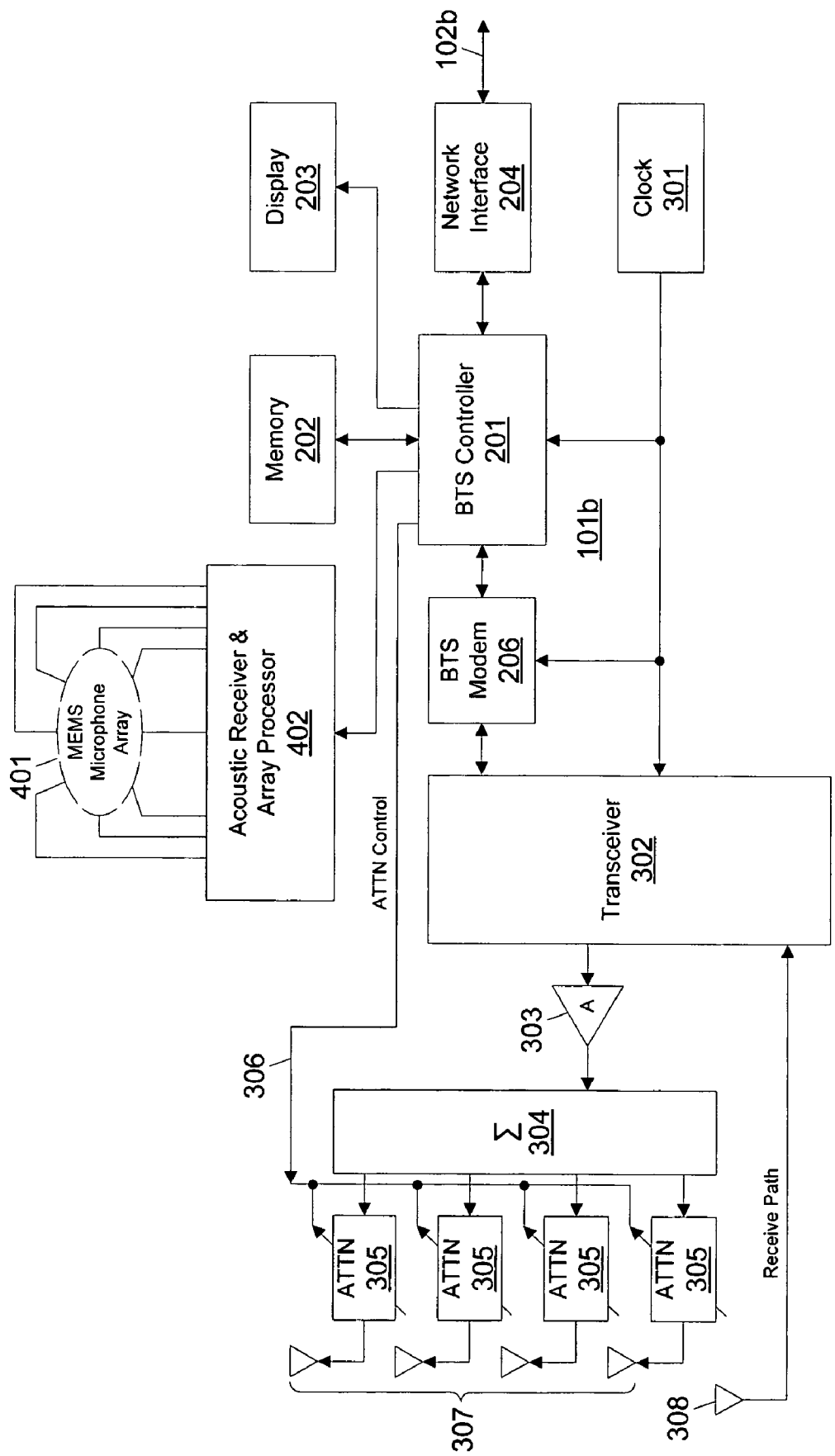
FIG. 4 is a high-level block diagram of a small office/home office base transceiver station with self-discovery of interior directions according to a third embodiment of the disclosure.

FIG. 4 is a high-level block diagram of a small office/home office base transceiver station with self-discovery of interior directions according to a third embodiment of the disclosure. In this embodiment, the acoustic sensing array is implemented using a micro-electro-mechanical system (MEMS) microphone array 401. Acoustic signals detected by MEMS array 401 are processed by an acoustic receiver and array processor 402. Directions with many acoustic signals may be recognized by the processor 402 as, and communicated to processor or controller 201 as, directions of interior human activity. Directions with few or no acoustic signals can be recognized by the processor 402 and/or processor or controller 201 as directions of close proximity to an outside wall. The acoustic receiver and array processor 402 may operate continuously or periodically to build a profile of directions of interior human activity, and thus directions that need RF coverage by the small BTS 101*b*.

In each of the embodiments disclosed, once directions have been analyzed and the transmit powers for antenna elements set, reassessment may be triggered by some external event. For instance, loss of power to the small BTS 101*b* may cause the small BTS 101*b* to repeat performance of the process of detecting directions and interior human activity and setting transmit power for various transmit antenna elements accordingly. Likewise, a change in the physical orientation of small BTS 101*b*, as determined by a magnetic compass therein (not shown), may trigger such a reassessment.

In accordance with the present disclosure, a small BTS or repeater adaptively reduces adjacent cell interference based on position and orientation data determined relative to interior directions, even if unable to invoke interference reduction based on terminal pilot signal reports received by an interference management server adjusting omni-directional transmit power.

Although the present disclosure has been described with an exemplary embodiment, various changes and modifications may be suggested to one skilled in the art. It is intended that the present disclosure encompass such changes and modifications as fall within the scope of the appended claims.

Figure 5:
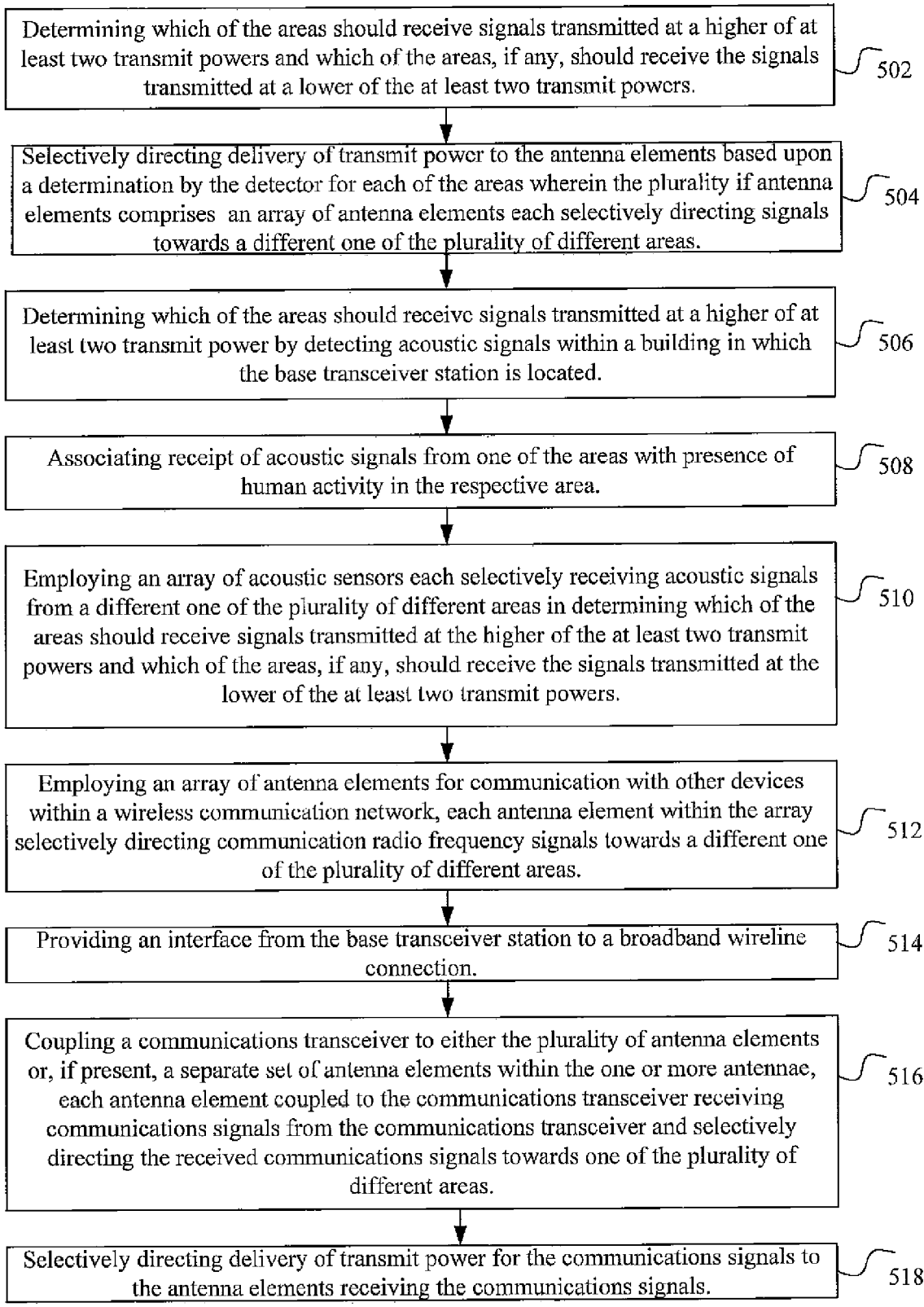
FIG. 5 is a method according to an embodiment of the disclosure.

FIG. 5 is a method 500 according to one embodiment of the disclosure. In block 502, the step of determining which of the areas should receive signals transmitted at a higher of at least two transmit powers and which of the areas, if any, should receive the signals transmitted at a lower of the at least two transmit powers is performed. In block 504, the step of selectively directing delivery of transmit power to the antenna elements based upon a determination by the detector for each of the areas wherein the plurality if antenna elements comprises an array of antenna elements each selectively directing signals towards a different one of the plurality of different areas is performed. In block 506, the step of determining which of the areas should receive signals transmitted at a higher of at least two transmit power by detecting acoustic signals within a building in which the base transceiver station is located is performed. In block 508, the step of associating receipt of acoustic signals from one of the areas with presence of human activity in the respective area performed. In block 510, the step of employing an array of acoustic sensors each selectively receiving acoustic signals from a different one of the plurality of different areas in determining which of the areas should receive signals transmitted at the higher of the at least two transmit powers and which of the areas, if any, should receive the signals transmitted at the lower of the at least two transmit powers is performed. In block 512, the step of employing an array of antenna elements for communication with other devices within a wireless communication network, each antenna element within the array selectively directing communication radio frequency signals towards a different one of the plurality of different areas is performed. In block 514, the step of providing an interface from the base transceiver station to a broadband wireline connection is performed. In block 516, the step of coupling a communications transceiver to either the plurality of antenna elements or, if present, a separate set of antenna elements within the one or more antennae, each antenna element coupled to the communications transceiver receiving communications signals from the communications transceiver and selectively directing the received communications signals towards one of the plurality of different areas is performed. In block 518, the step of selectively directing delivery of transmit power for the communications signals to the antenna elements receiving the communications signals is performed.

What is claimed is:

1. A system for configuring a base transceiver station having one or more antennae forming a plurality of antenna elements, the antenna elements selectively directing signals towards one or more of a plurality of different areas relative to a location of the base transceiver station, the system comprising:

an acoustic detector determining which of the areas should receive signals transmitted at a higher of at least two transmit powers; and a controller selectively directing delivery of transmit power to the antenna elements based upon a determination by the acoustic detector for each of the areas; wherein the plurality if antenna elements comprises an array of antenna elements each selectively directing signals towards a different one of the plurality of different areas.

2. The system according to claim 1, wherein the detector determines which of the areas should receive signals transmitted at a higher of at least two transmit power by detecting interior directions within a building in which the base transceiver station is located from which acoustic signals are received.

3. The system according to claim 2, wherein the detector further comprises an acoustic sensing array.

4. The system according to claim 3, wherein a controller within the base transceiver station associates receipt of acoustic signals by the acoustic detector from one of the areas with presence of human activity within the respective area.

5. The system according to claim 3, wherein the detector further comprises a micro-electro-mechanical system (MEMS) microphone array.

6. The system according to claim 1, wherein the system is included within a base transceiver station, the base transceiver station further comprising:

an interface to a broadband wireline connection; and a communications transceiver coupled to either the plurality of antenna elements or, if present, a separate set of antenna elements within the one or more antennae, each antenna element coupled to the communications transceiver receiving communications signals from the communications transceiver and selectively directing the received communications signals towards one of the plurality of different areas, wherein the controller selectively directs delivery of transmit power for the communications signals to antenna elements receiving the communications signals.

7. The system according to claim 6, wherein the base transceiver stations is included within a wireless communications network, the wireless communications network further comprising:

an other base transceiver station that does not detect communications signals transmitted by the base transceiver station; and a subscriber unit receiving detectable communications signals from the other base transceiver station but not from the base transceiver station.

8. A method for configuring a base transceiver station having one or more antennae forming a plurality of antenna elements, the antenna elements selectively directing signals towards one or more of a plurality of different areas relative to a location of the base transceiver station, the method comprising:

based on detection of acoustic signals, determining which of the areas should receive signals transmitted at a higher of at least two transmit powers and which of the areas, if any, should receive the signals transmitted at a lower of the at least two transmit powers; and selectively directing delivery of transmit power to the antenna elements based upon a determination by the detector for each of the areas wherein the plurality if antenna elements comprises an array of antenna elements each selectively directing signals towards a different one of the plurality of different areas.

9. The method according to claim 8, further comprising:
determining which of the areas should receive signals transmitted at a higher of at least two transmit power by detecting acoustic signals within a building in which the base transceiver station is located.

10. The method according to claim 9, further comprising:
associating receipt of acoustic signals from one of the areas with presence of human activity in the respective area.

11. The method according to claim 9, further comprising:
employing an array of acoustic sensors each selectively receiving acoustic signals from a different one of the plurality of different areas in determining which of the areas should receive signals transmitted at the higher of the at least two transmit powers and which of the areas, if any, should receive the signals transmitted at the lower of the at least two transmit powers.

12. The method according to claim 9, further comprising:
employing an array of antenna elements for communication with other devices within a wireless communication network, each antenna element within the array selectively directing communication radio frequency signals towards a different one of the plurality of different areas.

13. The method according to claim 9, further comprising:
providing an interface from the base transceiver station to a broadband wireline connection; and
coupling a communications transceiver to either the plurality of antenna elements or, if present, a separate set of antenna elements within the one or more antennae, each antenna element coupled to the communications transceiver receiving communications signals from the communications transceiver and selectively directing the received communications signals towards one of the plurality of different areas; and
selectively directing delivery of transmit power for the communications signals to the antenna elements receiving the communications signals.

14. A base transceiver station comprising:
a base transceiver station controller;
a communications transceiver coupled to the base transceiver station controller and to a first array of antenna elements each selectively directing communications signals to a different one of a plurality of ranges of directions originating from the base transceiver station; and
an acoustic sensor array coupled to the base transceiver station controller;
an array of antenna elements coupled to the base transceiver station controller and having a corresponding number and orientation to sensors within the acoustic sensor array, the acoustic sensor array detecting acoustic signals in each of the ranges of directions and determining in which of the ranges of directions acoustic signals are received,
wherein the base transceiver station controller controls delivery of transmit power by the communications transceiver to each of the antenna elements for radio frequency communication signals based upon whether acoustic signals were received from a corresponding range of directions by the acoustic sensor array.

15. The base transceiver station according to claim 14, wherein a processor coupled to the acoustic sensor array aggregates received acoustic signals over time.

16. The base transceiver station according to claim 15, wherein the processor coupled to the acoustic sensor array operates continuously to aggregate received acoustic signals over time in building a profile of directions of interior human activity.

17. The base transceiver station according to claim 15, wherein the processor coupled to the acoustic sensor array operates periodically to aggregate received acoustic signals over time in building a profile of directions of interior human activity.

18. The base transceiver station according to claim 15, wherein the processor coupled to the acoustic sensor array operates to aggregate received acoustic signals over time in response to a loss power to the base transceiver station or a change in orientation of the base transceiver station.

19. The base transceiver station according to claim 14, wherein the acoustic sensor array is a plurality of micro-electro-mechanical system (MEMS) microphones.

20. The base transceiver station according to claim 15, wherein the acoustic sensor array is a plurality of micro-electro-mechanical system (MEMS) microphones.

* * * * *